Patented Mar. 31, 1931

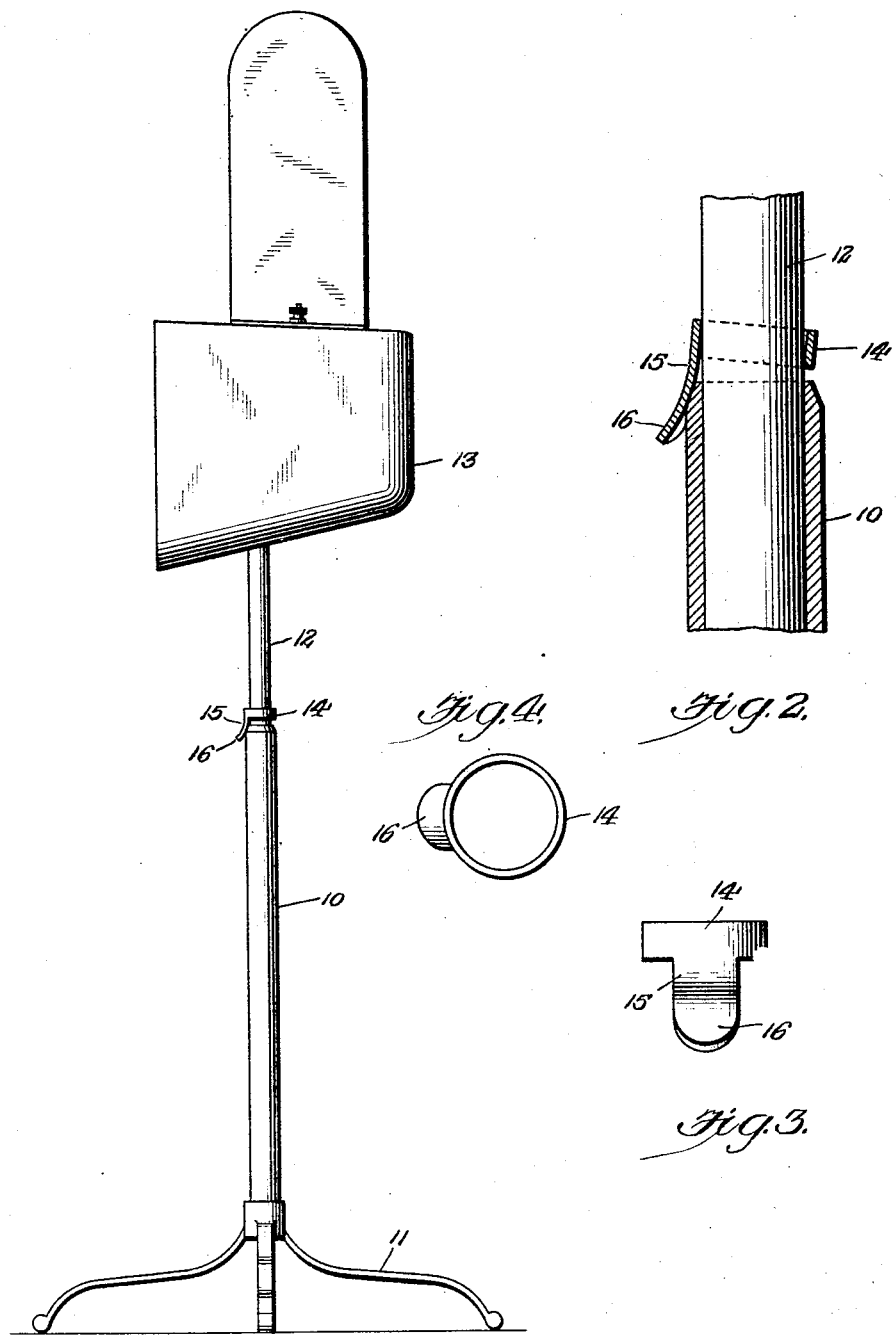

1,798,568

UNITED STATES PATENT OFFICE

JAMES H. WAGENHORST, OF JACKSON, MICHIGAN

ADJUSTABLE SUPPORT

Application filed January 31, 1928. Serial No. 250,868.

My invention relates to improvements in adjustable supports and has to do, more particularly, with means for automatically locking the relatively adjustable members of the support in adjusted position.

The principal object of my invention is to provide a cheap, simple and effective device for locking two relatively adjustable supporting members in adjusted position, which can be manipulated very quickly and easily when one wishes to change the adjustment.

Further objects, and objects relating to details and economies of construction and operation, will definitely appear from the detailed description to follow. In one instance, I attain the objects of my invention by the devices and means set forth in the following specification. My invention is clearly defined and pointed out in the appended claims. A structure constituting a preferred embodiment of my invention is illustrated in the accompanying drawings, forming a part of this application, in which:

Figure 1 is a view in side elevation of an adjustable support for an arc lamp and cabinet embodying my invention;

Fig. 2 is a fragmentary view of portions of the relatively adjustable members, the outer member and the clutch ring being shown in section, and Fig. 3 is a view of the clutch ring in side elevation.

In the drawings, the same reference numerals refer to the same parts throughout the several views.

Referring to the numbered parts of the drawing, I have shown my invention embodied in an adjustable support, which, as shown, is used to support an arc lamp and cabinet 13. This support comprises two longitudinally adjustable telescoping members and a clutch which automatically locks the members in adjusted position. One of these members is the tubular upright 10, supported, in the particular embodiment illustrated, on the base 11. The other of the relatively adjustable members is the rod 12 telescopically mounted and slidable in the tubular upright 10. The parts 10 and 12 are automatically locked in adjusted position by the clutch ring 14, which surrounds the rod 12 with considerable clearance. The ring 14 has a depending ear 15, the lower end of which is flared outwardly, at 16, to form a bevel surface, so to speak, for cooperation with a beveled surface on the tubular member 10. Preferably, the end of member 10 is simply beveled as shown in Fig. 2. With such a construction the two beveled surfaces engaging each other function to tilt ring 14 as shown in Fig. 2, thus firmly clutching rod 12 and member 10 together. This form of clutch is advantageous in that the member through which the clutching force is applied lies parallel to the longitudinal axis of the clutched members, and there are substantially no laterally protruding parts.

The load supported by the rod 12, in this instance the arc lamp and cabinet 13, is carried by the upper end of the rod. This load tends to make the rod 12 slide downwardly in the tubular upright 10, and such movement tends to carry the clutch ring 14 along with it so that the ear 15 engages the upper end of the tubular member 10 and tilts the ring into locking engagement with rod 12, thus locking the parts in adjusted position relative to each other. If these members are to be readjusted, one lifts the rod 12, thus relieving the pressure on ring 14, and lifts the ring out of engagement with the tubular upright 10. Holding the ring 14 out of engagement with member 10, the rod 12 can be moved to the desired position of adjustment and will be automatically locked in that position when the ring is released so that the force acting on rod 12 can carry the ear on the ring against the upper end of tubular member 10 and tilt the ring.

The force which tends to move the rod 12 in tubular member 10 is the load carried by rod 12, but this locking device can be used in other relations in which some force other than gravity tends to move the one member relative to the other, for instance, a spring pressure acting on one of the relatively adjustable members. Furthermore, so far as the clutch is concerned, the depending ear 15 need not be formed with such a pronounced beveled surface, as it will suffice if the ear itself is flared or offset so that its under surface presents substantially a beveled one, the principle on which the clutch works being that the uppermost portion of tubular member 10 functions as a wedge between the inner telescoping member and the ear 15 to tilt the ring 14 into clutching engagement with the inner member.

I am aware that the disclosed embodiment may be varied considerably without departing from the spirit of my invention, and therefore, I claim my invention broadly, as indicated by the appended claims.

What I claim is:

1. The combination of a tubular upright, a supporting rod slidable in said upright and carrying the load to be supported, and a clutch ring loosely embracing said rod above the tubular upright and having a depending, outwardly-flaring ear engaging the upper end of said upright to tilt said ring and thereby lock the rod in adjusted position with respect to the upright.

2. The combination of two telescoping members and a clutch ring loosely embracing the inner member, said ring having an extension projecting longitudinally of said telescoping members, and said outer member having a wedge portion entering between said extension and inner member to tilt the ring into clutching engagement with the inner member.

3. The combination of two telescoping members and a clutch ring loosely embracing the inner member, said ring having an extension projecting longitudinally of said telescoping members, and said outer member having a beveled surface engaging said extension to tilt the ring into clutching engagement with the inner member.

4. The combination of two telescoping members and a clutch ring loosely embracing the inner member, said ring having an extension projecting longitudinally of said telescoping members, and said extension and outer member having cooperating beveled surfaces to tilt the ring into clutching engagement with the inner member.

5. The combination of telescoped inner and outer members, and a clutch ring disposed about the exposed portion of said inner member, said ring having an ear bearing against the outer surface of said outer member wedging a portion of said outer member between said inner member and said ear and tilting said clutch ring into locking engagement with said inner member.

JAMES H. WAGENHORST.